(12) United States Patent
Leyh et al.

(10) Patent No.: US 10,014,892 B1
(45) Date of Patent: Jul. 3, 2018

(54) SYSTEM AND METHOD FOR MITIGATING ELECTRONIC INTERFERENCE

(71) Applicant: MOTOROLA SOLUTIONS, INC, Chicago, IL (US)

(72) Inventors: Arthur Christopher Leyh, Spring Grove, IL (US); Sanjaykumar S. Karpoor, Buffalo Grove, IL (US); David P. Gurney, Carpentersville, IL (US); Gregory J. Buchwald, Crystal Lake, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/645,393

(22) Filed: Jul. 10, 2017

(51) Int. Cl.
*H04B 1/10* (2006.01)
*H04B 17/345* (2015.01)
*H04B 1/38* (2015.01)

(52) U.S. Cl.
CPC ............. *H04B 1/1027* (2013.01); *H04B 1/38* (2013.01); *H04B 17/345* (2015.01)

(58) Field of Classification Search
CPC .................................................. H04B 1/1027
USPC ........................................................ 455/296
See application file for complete search history.

(56) References Cited

U.S. PATENT DOCUMENTS

| 6,961,017 | B1 | 11/2005 | Naylor et al. | |
| 7,324,064 | B2 | 1/2008 | Fox et al. | |
| 7,426,232 | B2 * | 9/2008 | Matsuoka | H04B 7/082 375/148 |
| 7,733,288 | B2 | 6/2010 | Williams | |
| 2006/0009177 | A1 * | 1/2006 | Persico | H04B 1/109 455/143 |
| 2010/0330915 | A1 * | 12/2010 | Parizhsky | H04B 7/0608 455/63.1 |
| 2014/0125520 | A1 | 5/2014 | Fenton | |

OTHER PUBLICATIONS

Gutleber: United States Statutory Invention Registration—H740, application No. 374,124, filed: Jun. 13, 1989, published Feb. 6, 1990.
Radio Free Asia: Anti-Jamming Antenna, http://www.rfa.org/about/help/Anti-Jamming-05022007110912.html, downloaded from internet: Jun. 20, 2017, all pages.

* cited by examiner

*Primary Examiner* — Sanh Phu
(74) *Attorney, Agent, or Firm* — Barbara R. Doutre

(57) ABSTRACT

A communication system (200) is formed of a base station comprising a main base station receiver with a main base station antenna (202) and a secondary receiver with a secondary antenna (212). The secondary receiver detects interference to the main base station antenna (202) causing reduced communications range for communicating with subscriber units (204). The secondary receiver rotates a receiver null (228) of the secondary antenna (212) to reduce the interference in response thereto. The communication system (200) performs a voting decision that selects between the secondary receiver with rotated receiver null and the main base station receiver (104) with reduced communications range, to mitigate the interference to main base station antenna (102).

24 Claims, 5 Drawing Sheets

TWO CO-LOCATED RECEIVERS

RE-PURPOSE EXISTING RECEIVERS

SYSTEM AND METHOD FOR MITIGATING ELECTRONIC INTERFERENCE

FIELD OF THE DISCLOSURE

The present disclosure relates generally to communication systems and more particularly to the mitigation of an electronic interference source within a communication system.

BACKGROUND

The desire to maintain effective wireless communications is paramount when operating in public safety environments, such a law enforcement, fire rescue, and medical emergencies to name a few. Electronic interference, whether intentional or unintentional, can be disruptive to a communication system. A radio jammer is an electronic device that intentionally interferes with or blocks authorized communications. While jamming devices are illegal in many countries, the ability to purchase such devices online remains problematic. Unintentional interference, on the other hand, may be based on a device malfunction or accidental circumstances, such as inadvertent transmissions on busy frequencies or accidently radiating signals that cause interference with equipment. For example a television station being emitted over a police radio channel. Electronic interference of emergency calls, such as emergency 911 calls, law enforcement back up calls, and the like, can result in life threatening consequences. Electronic interference sources positioned near radio base stations and/or repeaters tend to be particularly problematic in that they can interfere with large coverage areas.

Accordingly, there is a need to mitigate electronic interference to a communication system. The ability to mitigate jamming from an electronic interference source would be particularly beneficial in public safety environments such as a public safety headquarters or at an incident scene command center.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
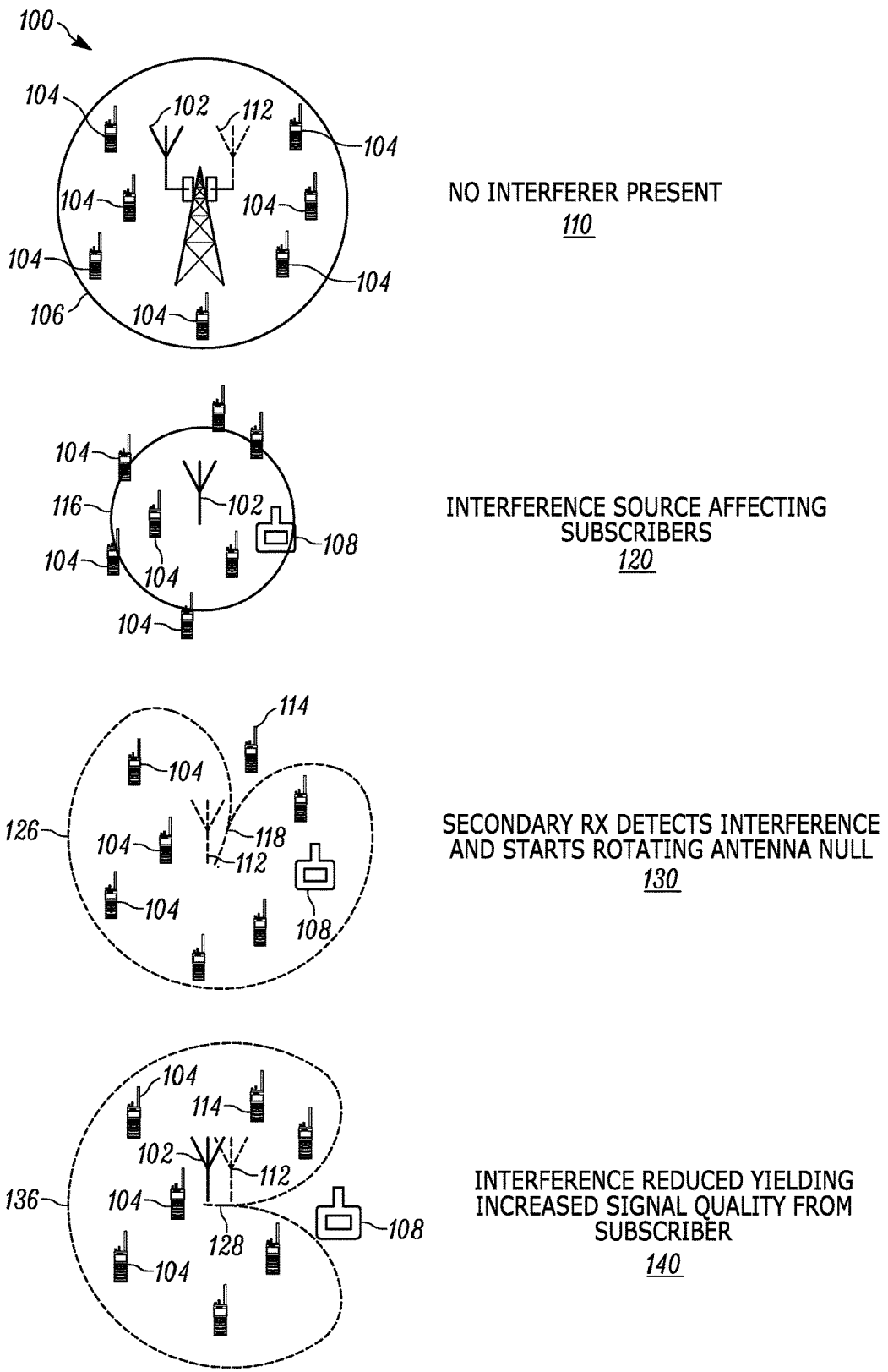
FIG. 1 is a diagram of a communication system that mitigates electronic interference in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a system and method for mitigating electronic interference of a base station or repeater. A base station is reconfigured either through the addition of a secondary receiver and secondary antenna or through the reconfiguration of existing receivers and antennas already present at a base station. Base stations having more than one receiver can now be re-configured so that one receiver and antenna operates as a main antenna and the other operates as a secondary receiver and antenna for detecting interference. The various embodiments provide that the secondary antenna operates as a geometrically selective notch antenna providing predetermined attenuation to yield improved signal quality. A voting decision is then performed by the communications system to select the optimum receiver and antenna for uplink channel communications. The approach provided herein advantageously prevents the disruption of information flow in both audio and data wireless data networks. Both land mobile radio (LMR) and long term evolution (LTE) type systems can benefit in which a transceiver operates using a receive (RX) uplink channel for a receive mode and a transmit (TX) downlink channel for transmit mode.

While the embodiments are described in terms of a jamming device attempting to disrupt communications via intentional interference, it will be appreciated that the mitigation approach provided herein is also applicable to a communication system being disrupted by unintentional interference. Unintentional interference may originate, for example, from interference sources like intermodulation and/or passive intermodulation (IM/PIM) from cellular base stations, power line noise or LED lighting noise that are sometimes seen in 700/800 MHz systems. Thus, the interference source may comprise an intentional jamming interference source and/or unintentional interference source.

In some embodiments, a communication system that typically utilizes a base station having a single receiver and antenna, such as a digital mobile radio (DMR) communication system is reconfigured to add a secondary receiver with selectable notch antenna. The additional, secondary receiver and antenna are configured to scan for interference, and when such interference is detected, the secondary receiver steers a secondary antenna pattern to target a null towards the jammer thereby achieving a minimum interference level. The secondary receiver is then programmed to the same channel as the main receiver. The communications system then votes between the secondary receiver antenna pattern and the main receiver antenna pattern based on signal quality. Communications proceed using the voted antenna.

In another embodiment, the mitigation approach is applied to a communication system in which two receivers and antennas already exist at a base station, such as a dual watch base station having two receivers, a dual diversity base station having one box with split receiver paths, or other two receiver base station system. In this approach, one of the receivers is reconfigured to operate as a main receiver, while the other receiver is reconfigured to operate as a secondary receiver. The secondary receiver and antenna are reconfigured or repurposed to scan for interference, detect interference, and steer the secondary antenna pattern to null a jamming device thereby achieving minimum interference level, as described previously. The repurposed secondary receiver is then reprogrammed, from its previous usage application, to the same channel as the main receiver. The communication system then votes between the secondary receiver and the main receiver antenna patterns based on signal quality, and communications proceed using the voted antenna.

In yet another embodiment, the mitigation approach is applied to a communication system having two or more receivers with antennas, such as TETRA, triple diversity, and the like. In this case, the receivers are reconfigured to operate with one receiver acting as a main receiver and the other receivers operating as secondary receivers. The secondary receivers and antennas already operate on the same channel as the main receiver thus negating the need for any reprogramming. One of the secondary receivers is reconfigured for scanning for interference, detecting interference, and steering a null to achieve a minimum interference level, while the other secondary receiver(s) remains configured for receiving the same signal as the main receiver. The communications system votes between the secondary receiver antenna pattern and the main receiver antenna pattern. Communications proceed using the voted antenna. In system having three or more receivers (one configured as main, the others as secondaries) scanning can be done continuously by one or more of the repurposed secondary receivers.

The various embodiments describe voting taking place via a microprocessor of the communication system. For example, voting may take place at the base station (either embedded in the base station itself or in an external "box" coupled to the system). The microprocessor that controls the voting may be located within a box that contains the main receiver, a separate box, an application running on a server, or even cloud based, to name a few. The signals being voted on are signals from subscribers and are received from multiple receivers. At least two receive signals are evaluated for signal quality. In accordance some embodiments, the signal quality comprises a signal to noise estimate, and for digital transmissions the signal quality comprises bit error rate. The signal that has the highest signal quality is voted to be transmitted (repeated to the rest of the subscribers on the down link), the ones not voted are discarded. The data burst packets in digital mode are sent from secondary receivers to the voter via IP. In an analog mode, an analog signal can be sent over telephone lines.

The actual antenna patterns and ranges are unknown, all the voter knows is the inbound signal quality from the main and secondary receivers. So depending on where a subscriber is located, its' inbound signal will have a higher signal to noise from one antenna or the other. In general, for a subscriber located outside of the null of the secondary antenna, then the signal from the secondary receiver coupled to the secondary antenna will be better. However if the subscriber is located in the null, depending on how close the subscriber is to the null and how deep the null is, there may be a better signal on the main receiver coupled to main antenna. Although the main receiver signal may be degraded, due to the presence of the jammer, the main receiver may still be preferable to the null which may reject the subscriber even more, pushing it into the noise floor.

FIG. 1 shows different stages of antenna patterns for a communication system 100 in accordance with some embodiments. In view 110 communication system 100 comprises a base station having two receivers, one operating as a main receiver antenna 102 receiving communications from a plurality of subscriber units 104 using uplink channels. The main receiver coupled to a main antenna 102 is always on the communication channels. In accordance with the embodiments, at least one secondary receiver has either been added to the system, or has been reconfigured within the existing system, to control a secondary antenna 112.

In view 120, an electronic jammer device 108 is shown to interfere with the base station receiver antenna 102, thereby creating an impacted receiver pattern 116 indicative of reduced communications range and power level. Many of the subscribers 104 are unable to communicate due to the uplink channels being jammed. The jammer signal of jammer device 108 attacks the base station by generating high signal levels on the uplink that degrade the received signal to noise levels from the subscribers 104. Thus, the range at which the subscribers can operate is reduced. Subscriber units having high enough signals (close to the base receiver/ within pattern 116) may be able to overcome the added jammer interference 116. The amount of range reduction depends on the jammer power level as received at the base station receiver.

In view 130, in accordance with the embodiments, the secondary receiver antenna 112 scans for interference from the jammer device 108 using antenna pattern 126. In accordance with the embodiments, the secondary antenna 112 operates as a geometrically selective notch antenna providing predetermined attenuation to yield improved signal quality. For example, one method to detect interference is to check an idle channel to see if there is power, indicative of jamming interference. An example of a geometrically selective notch antenna is an Adcock antenna array. The Adcock antenna array can be adapted for use over a broad range of frequencies such as, Very High Frequency range (VHF) 30 MHz-300 MHz, up to Ultra High Frequency (UHF) 300 MHz-3 GHz.

One of the plurality of subscriber units 114 is now located outside of the pattern 126 and thus is not only impacted by the reduced communications range in view 120 but also the notch of pattern 126. In accordance with the embodiments, the secondary receiver begins to rotate the null to more precisely align with the jammer, as shown in the next view.

As shown in view 140, in response to detecting interference, the secondary receiver has steered the secondary antenna notch to align with and null out the jammer device 108 with steered antenna pattern 136. Hence, interference has been minimized. As shown in this view, subscriber unit 114 is now located inside the antenna pattern, while the jammer is nulled out. Minimizing the interference yields an increased signal quality from the subscriber. Hence, the addition of a secondary receiver with selective notch antenna 112 can advantageously be used to mitigate electronic jamming. The ability to further optimize antenna patterns is described through a voting process described next.

Figure 2:
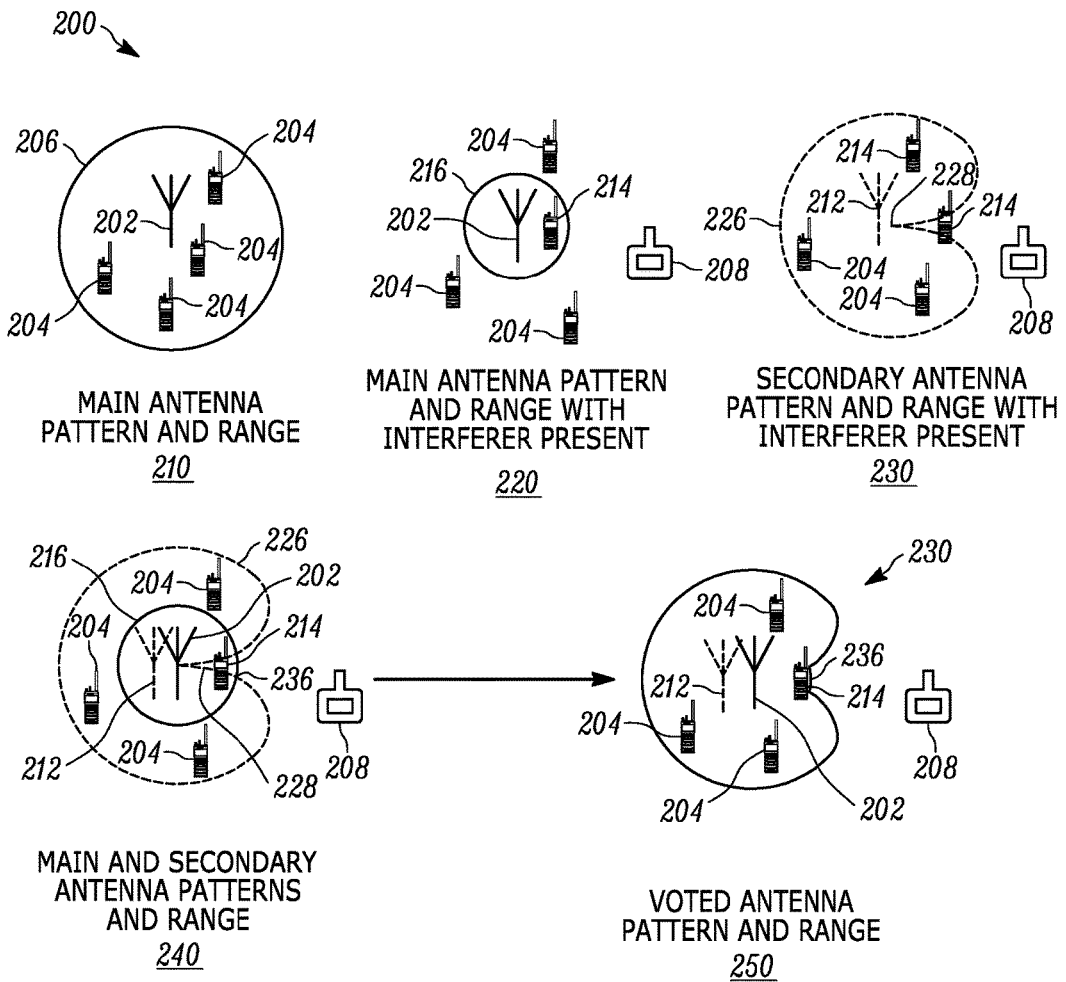
FIG. 2 is a diagram of a communication system that further incorporates voting as part of mitigating electronic interference in accordance with some embodiments.

FIG. 2 shows another diagram of a communication system 200 that mitigates electronic jamming in accordance with the embodiments through the use of a main receiver and main antenna along with a secondary receiver and secondary antenna. In view 210, a main receiver antenna 202, and a plurality of subscriber units 204 operate within a main antenna pattern 206. In view 220, a jamming device 208 has interfered with the main receiver antenna 202, negatively impacting the main antenna pattern 206, as shown by impacted main antenna pattern 216. The impacted main antenna pattern 216 represents reduced communications range and power levels as impacted by the jamming device 208. In this view only one of the plurality of communication devices 204, shown as subscriber unit 214, is able to communicate on an uplink channel with main receiver antenna 202, while the coverage has been impacted thereby disabling communication with other subscribers.

View 230 shows the secondary receiver antenna 212 and its associated secondary notch antenna pattern 226 having notch 228. The secondary receiver and secondary receiver antenna 212 may have been added to the system 200 or already existed in the system for another purpose, such as dual watch. The secondary antenna operates, as previously described, as a geometrically selective notch antenna providing predetermined attenuation to yield improved signal quality. In this view, the secondary receiver antenna 212 had already been steered to align with the jammer device 208. As shown in this view, while the majority of the plurality of subscribers 212 would now be able to communicate within this secondary notch antenna pattern 226, there is still one of the plurality of communication devices 204, that being subscriber unit 214, which is being impacted by the notch 228. This impacted subscriber unit 214 is addressed in view 240.

View 240 shows both main and secondary receiver antennas 202, 212 and their respective patterns comprising impacted main antenna pattern 216 and secondary notch antenna pattern 226. As can be seen in this view one of the plurality of communication devices 204, that being subscriber unit 214, remains within the notch 228 of secondary notch antenna pattern 226, however subscriber unit 214 can now advantageously communicate if main antenna pattern 212 associated with the first receiver antenna 202 were used. Thus, in accordance with the embodiments, a voting decision takes place to select between the two antennas patterns 216, 226 based on signal quality. The voting decision takes place via a microprocessor of the communication system. For the purposes of this application the microprocessor that controls the voting may be located within the box that contains the main receiver, a separate box, an application running on a server, or even within a cloud based system, to name a few. For the purposes of this application signal quality may comprise, signal-to-noise ratio (SNR), bit error rate (BER), frequency error rate (FER), digital audio quality (DAQ), and/or other parameters as appropriate to the type (e.g. digital or analog) of communication system. The signal noise quality parameters may vary based on the system being an analog system, a digital system, a stationary system, a mobile system, a TETRA system, and APCO25 system, to name a few. The voting selection may further be based on subscriber GPS (and approximate knowledge of interference region). In accordance with the embodiments, voting allows for an improved coverage area encompassing the better signals of the secondary notch antenna pattern 226 and a portion 236 of the main impacted antenna pattern 236 that is still stronger than the secondary notch antenna pattern 226. Accordingly, antenna subscriber units 204 can still communicate via secondary receiver antenna 212 while subscriber unit 214 communicates using main receiver antenna 202.

The embodiments of FIGS. 1 and 2 are readily applicable to digital mobile radio (DMR) systems normally having one base station receiver and antenna where an additional receiver and antenna is added to the base station or a P25 system where there are two receivers in the base station already. The embodiments are readily applicable to dual and triple diversity systems. The system can be implemented using two physical base station receiver boxes, or a single box with diversity built in by splitting two receivers' outputs and voting between them, thereby adding voting in a diversity path.

Figure 3:
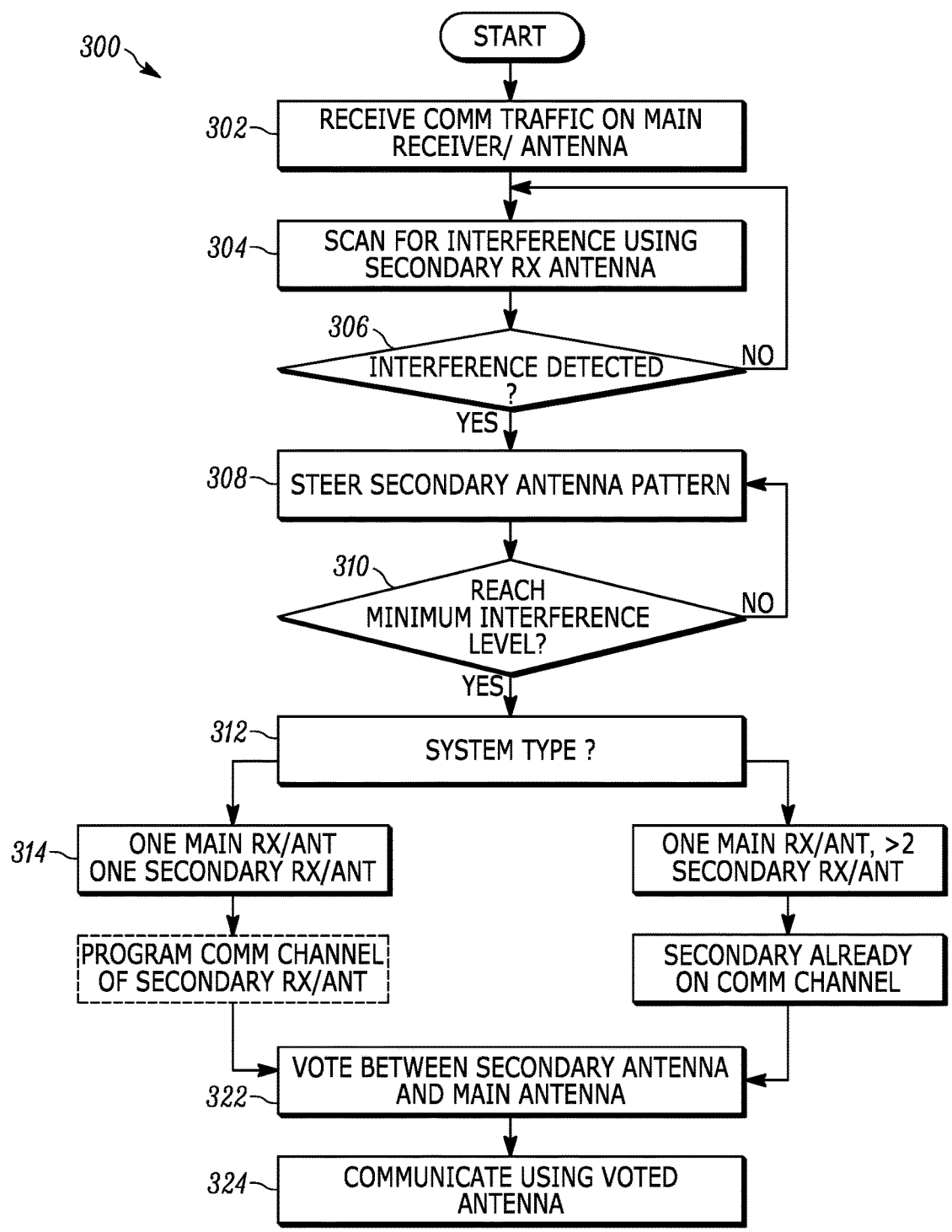
FIG. 3 is a method of mitigating electronic interference of a communication system in accordance with some embodiments.

FIG. 3 is a method 300 of mitigating electronic jamming of a communication system in accordance with some embodiments. The method will be described in terms of a system having two receivers (configured as one main receiver and one secondary receiver) and then a system having more than two receivers (configured as one main receiver and more than one secondary receiver).

Method 300 begins with a communication system receiving communication traffic on a main receiver and main antenna at 302. During this communication, a secondary receiver antenna scans for interference from an electronic jamming device at 304 using a secondary antenna pattern notch antenna pattern.

For embodiments with more than two receivers, scanning can take place continuously until interference is detected at 306. For embodiments with only two receivers, scanning is done off-channel. In either case, the secondary antenna pattern is steered at 308 until a minimum level of interference is achieved at 310. Depending on the system type at 312 the method 300 will branch out in two different paths.

For a system 314 configured with a main receiver and main antenna and a single secondary receiver and secondary antenna, the secondary receiver will automatically be reprogrammed to the communication channel of the main receiver. Voting then takes place at 322, via a microprocessor of the communication system, to select between the secondary antenna and the main antenna patterns based on signal quality. Voting selection may further be based on knowledge of an interference region impacting a subscriber unit of the communication system and subscriber GPS for that subscriber unit. Communication then takes place at 324 using the voted antenna.

For a system configured with a main receiver and more than two secondary receivers and secondary antennas 318, the secondary receiver and antenna will already be on the main receiver's communication channel, so no reprogramming is needed. The additional receivers can be used to provide continuous scan to detect interference while the other receivers measure such parameters as gain, SNR, and other signal quality factors. Voting takes place at 322 to select between the secondary antenna and the main antenna patterns based on signal quality in the manner previously described. A plurality of voting inputs can be used to determine the best antenna/receiver. For example, voting may also comprise sending instructions from the communications system to back the null out of the secondary receiver thereby regaining some coverage from the secondary antenna, as appropriate. This ensures that certain subscriber units, such as those belonging to first responders do not get nulled out. Communication then takes place at 324 using the voted antenna.

As described previously, in some cases, the proximity and signal strength of the subscriber device relative to the main base station may allow for communications to remain with the main base station antenna, while in other cases, a subscriber that previously would have been jammed can now use the secondary antenna for communications with the base station.

At the voting stage 322, controlled by a processor of the communications system, and does not know what channel the secondary receiver is programmed to, the voter only sees data bursts. Voting occurs on every packet generated from the secondary receiver and the main receiver. However, in accordance with the various embodiments, the voter is always running, thus advantageously ensuring that the mitigation performance will always be at least as good as that provided by the main receiver. As described previously the voter may be located within the base station or as an external box coupled to the base station.

Figure 4:
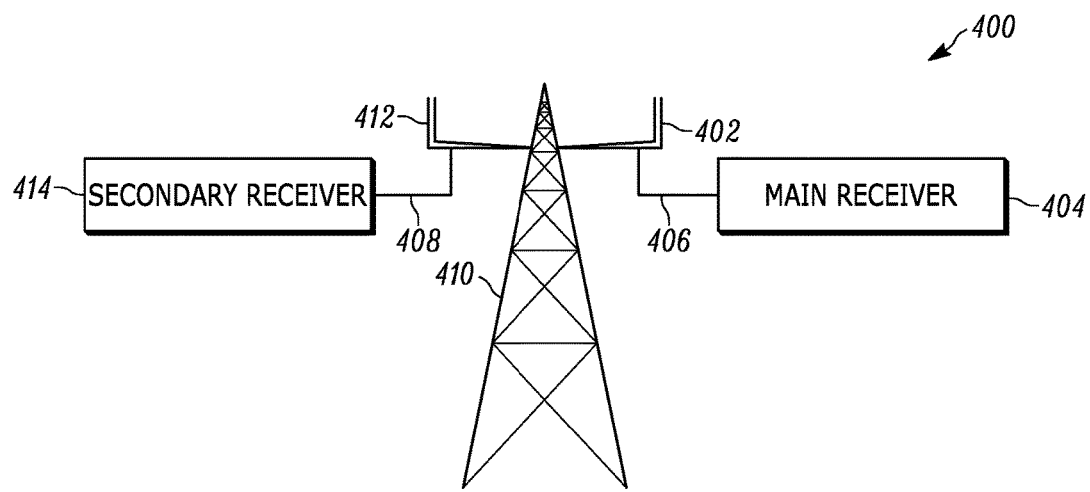
FIG. 4 is an example of a communication system operating in accordance with some embodiments.

FIG. 4 is a communication system operating in accordance with some embodiments. Communication system 400 comprises a base station 410 having a main receiver antenna 402 coupled, such as through a coaxial cable or other interconnect means, to a main receiver 404. The communication system may be a digital system or an analog system or some combination thereof. The communication system 400 is one that typically utilizes only one receiver, that being the main receiver 404. Such systems may comprise, but are not limited to, a digital mobile radio (DMR) system, a P25 radio system, and other systems utilizing a single receiver at each base station. In accordance with some embodiments, communication system 400 further comprises an additional receiver, referred to as secondary receiver 414. Secondary receiver 414 may be added to the system 400 using an appropriate interconnect 408, such as a coaxial cable, coupling secondary antenna 412. In accordance with this embodiment, the two receivers comprising main receiver 404 and secondary receiver 414 are co-located, within a predetermined distance from each other, such as 100 meters.

In accordance with this embodiment, the secondary receiver 414 scans for interference at antenna 412. This is achieved, as previously described, by rotating the secondary antenna pattern while searching for interference. Once interference has been detected, the secondary antenna pattern is more precisely steered until a minimum interference level is reached. An electronic processor, associated with the secondary receiver 414, then reprograms the secondary receiver to a communication channel of the main receiver 404 thereby providing a null at the jamming frequency within that channel. The overall antenna pattern is thus improved as was shown in FIGS. 1 and 2.

In accordance with the embodiments, a processor associated with the communications system 400 then performs voting to determine which receiver, main receiver 404 or secondary receiver 414, has the best signal quality. Voting between the two receivers allows an overall improved antenna pattern that mitigates interference as was shown in FIG. 2.

Is some embodiments, the secondary receiver may already exist within the system, such as a dual watch system or dual diversity system which utilizes two receivers. If two receivers are available then, one of the receivers can be repurposed as a secondary receiver and operation is as described in the embodiment of FIG. 4. Thus, the communication system 400 may comprise a dual watch or dual diversity system having first and second receivers, in which the first receiver operates as the main receiver configured to control the voting decision, and the secondary receiver is reconfigured to control the null.

Figure 5:
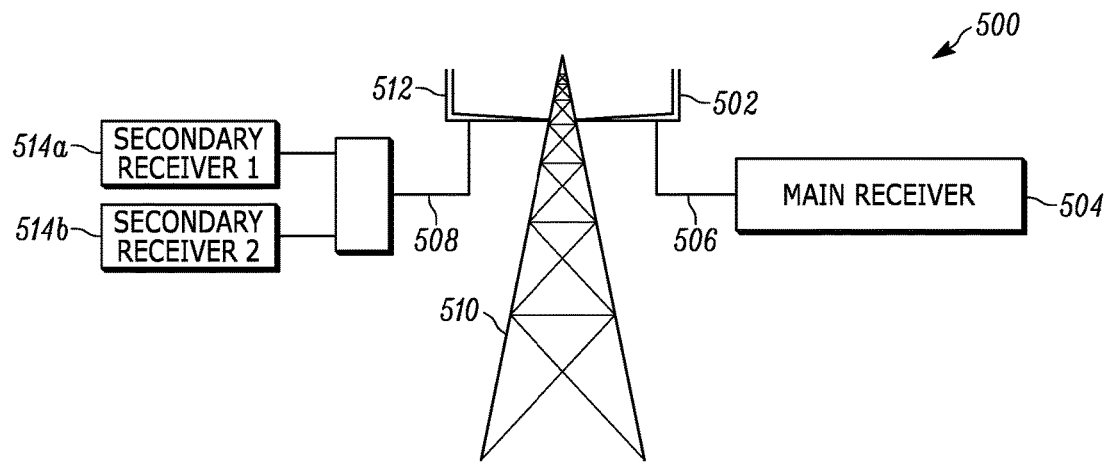
FIG. 5 is another example of a communication system operating in accordance with some embodiments.

FIG. 5 is another communication system formed and operating in accordance with some embodiments. Communication system 500 comprises a base station 510 having a main receiver antenna 502 coupled, such as through a coaxial cable or other interconnect means, to a main receiver 504. The communication system 500 is a system that already has three receivers, making it a triple diversity system, such as a TETRA system.

In accordance with this embodiment, communication system 500 repurposes two receivers of the three receivers as two secondary receivers 514a, 514b, coupled through an appropriate interconnect 508, such as a coaxial cable, to an antenna 512, now operating as a single secondary antenna to the two receivers. In accordance with this embodiment, the first secondary receiver 514a operates as an interference detection receiver, while the second secondary receiver 514b is always tuned to the same frequency as the main receiver 504. The two secondary receivers 514a, 514b are thus advantageously able to simultaneously track interference and gain. In accordance with this embodiment, the first secondary receiver 514a continuously scans for interference, while the second secondary receiver 514b can stay on the same channel as the main receiver to measure gain.

In accordance with this embodiment, the first secondary receiver 514a is able to continuously scan for interference at antenna 512, in the manner previously described. In this embodiment, the system advantageously negates any need for any reprogramming of the first secondary receiver 514a, because the second secondary receiver 514b is already programmed to the same communication channel as the main receiver 504. The null, as provided by antenna 512, is thus able to minimize interference from a jamming device.

The communication system 500 advantageously provides continuous scanning by first secondary receiver 514a so that any changes in signal interference from the jamming device can be detected, even if the jamming device changes locations. In accordance with the embodiments, a processor associated with the communications system 500 performs voting to determine which receiver, main receiver 504 or second secondary receiver 514b, has the best signal quality. Communications can then take place using the voted antenna.

The interference mitigation of this embodiment can be applied to a multi-carrier base station, such as a base station rack, providing a wideband receiver with a plurality of receiver cards. For example a wideband receiver base station rack comprising eight channels can provide eight different antenna patterns over eight different antennas to detect interference. Hence, receivers can be added, such as was shown in FIG. 4, or existing receivers can be repurposed, as provided by the embodiments of FIG. 5. Accordingly, the mitigation approach provided by the various embodiments is readily applicable to a variety of systems.

Figure 6:
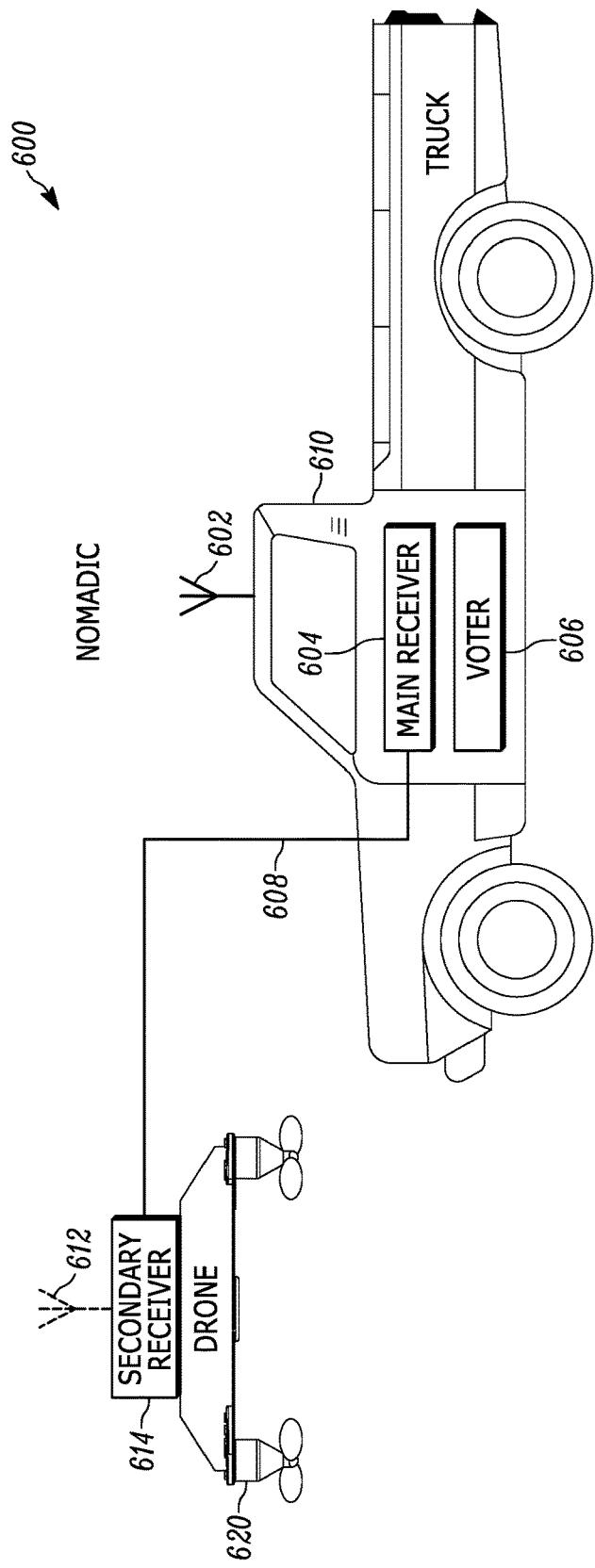
FIG. 6 is yet another example of a communication system operating in accordance with some embodiments.

FIG. 6 is another communication system operating in accordance with some embodiments. Communication system 600 is a nomadic system in which a main receiver 604 with main receiver antenna 602 is mounted to a vehicle 610. Communication system 600 further comprises at least one secondary receiver 614 with a secondary antenna 612 coupled to a drone 620. A tether 608 couples the at least one secondary receiver 614 to the main receiver 604, the tether providing power and network traffic to the at least one secondary receiver 614. In accordance with this embodiment, the receive signal would be sent via IP down the tether 608 to a voter 606, under microprocessor control. This embodiment advantageously prevents a jammer from wiping out a wireless backhaul system.

In accordance with this embodiment, the drone 620 provides rotation for controlling the interference null of the secondary antenna 612, as in the two receiver case described in FIG. 4. The use of the drone provides the further advantage of precise rotation of the secondary antenna null to mitigate interference from a jamming device.

Accordingly, there has been provided an improved approach to mitigating electronic interference to a communication system. The electronic interference may be intentional or unintentional. Base stations having more than one receiver (added to or pre-existing) can now be re-configured so that one receiver and antenna operates as a main antenna and the other operates as a secondary receiver and antenna, for detecting interference. The various embodiments provide that the secondary antenna operates as a geometrically selective notch antenna providing predetermined attenuation to yield improved signal quality. A voting decision is then performed by the communications system to select the optimum receiver and antenna for uplink channel communications. The approach provided herein advantageously prevents the disruption of information flow in both audio and data wireless data networks. Both land mobile radio (LMR) and long term evolutions (LTE) type systems can benefit.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A communication system, comprising:
   a base station comprising a main base station receiver and a main base station antenna;
   a secondary receiver having a secondary antenna, the secondary receiver scanning for electronic interference and detecting electronic interference on an uplink channel to the main base station antenna, the electronic interference causing reduced communications range, and the secondary receiver steering a receiver null of the secondary antenna to reduce the electronic interference in response thereto; and
   the communication system performing a voting decision that selects between the secondary receiver with rotated receiver null and the main base station receiver with reduced communications range, to mitigate the electronic interference to the uplink channel of the main base station.

2. The communication system of claim 1, wherein:
   a subscriber unit located in the receiver null maintains communication via the main base station receiver with reduced communications range; and
   another subscriber unit located outside of the reduced communications range and inside of a secondary receiver pattern associated with the secondary receiver maintaining communication via the secondary receiver.

3. The communication system of claim 1, wherein the secondary receiver is used to steer the receiver null towards an interference source generating the electronic interference.

4. The communication system of claim 1, wherein the mitigated electronic interference yields increased receive signal quality from at least one subscriber unit of the communication system.

5. The communication system of claim 1, wherein the voting decision is based on signal quality between the secondary receiver and the main receiver, and the voting occurs on every data burst packet generated from the secondary receiver and the main receiver.

6. The communication system of claim 1, a land mobile radio (LMR) having transceiver operating using a receive (RX) uplink channel for a receive (RX) mode and a transmit (TX) downlink channel for transmit mode.

7. The communication system of claim 1, wherein the secondary receiver is coupled to a drone tethered to the main base station receiver.

8. The communication system of claim 7, wherein rotation of the drone controls rotation of an antenna pattern of the secondary antenna, thereby controlling positioning of the receiver null.

9. The communication system of claim 1, wherein the communication system further comprises:
   another secondary receiver, wherein one of the secondary receivers operates as an interference detection receiver, while the other of the secondary receivers is always tuned to a frequency of the main receiver thereby providing for the simultaneously tracking of interference and gain.

10. The communication system of claim 1, wherein the base station is a diversity base station having two receivers and wherein voting and control of the receiver null are added within a diversity path.

11. The communication system of claim 1, wherein the communication system comprises a dual watch system having first and second receivers, in which the first receiver is reconfigured to operate as the main receiver to control the voting decision, and the second receiver is reconfigured to control the receiver null.

12. The communication system of claim 11, wherein the main receiver forwards an inbound signal from a subscriber unit of the communication system to the voter.

13. The communication system of claim 1, the communication system further comprising:
   a drone, the secondary receiver being coupled to the drone; and
   a tether for tethering the secondary receiver to the main receiver, the receiver being located in a vehicle, the tether providing power and network traffic to the secondary receiver, the drone providing rotation for controlling the receiver null of the secondary antenna.

14. The communication system of claim 1, wherein the secondary antenna comprises a geometrically selective notch antenna.

15. The communication system of claim 1, wherein the electronic interference is at least one of:
   intentional interference; and
   unintentional interference.

16. The communication system of claim 1, wherein the voting decision is further based on knowledge of an interference region impacting a subscriber unit of the communication system and subscriber GPS for that subscriber unit.

17. A method for receiving signals in a communication system, comprising:
   communicating using a base station having a main receiver and a main receiver antenna;
   scanning for interference to the main receiver and the main receiver antenna using a secondary antenna associated with a secondary receiver;
   detecting interference to the main receiver antenna;
   steering a null of the secondary receiver antenna to reduce the interference; and
   voting between the main receiver antenna and the secondary receiver to mitigate electronic interference to the base station that impacts communication with a subscriber device.

18. The method of claim 17, further comprising, prior to voting: reprogramming the secondary receiver to a communication channel of the main receiver.

19. The method of claim 17, wherein the communication system comprises more than two secondary receivers and scanning is performed continuously by at least one of the secondary receivers.

20. The method of claim 17, wherein the secondary receiver and secondary antenna are pre-existing to the base station, and the secondary receiver with secondary antenna are reconfigured to scan for interference.

21. The method of claim 17, wherein the secondary antenna with secondary receiver are added to the base station, and the secondary receiver with secondary antenna are configured for scanning.

22. The method of claim 17, further comprising:
   adding another secondary receiver to the base station of the communication system, wherein one of the secondary receivers provides the detecting interference to the main receiver antenna, while the other of the secondary receiver is always tuned to a frequency of the main receiver and tracks gain; and
   simultaneously tracking interference and gain.

23. A communication system, comprising:
   a base station;
   a microprocessor operatively coupled to the base station;
   a plurality of receivers coupled to the base station, the plurality of receivers comprising:
      a main receiver and a main receiver antenna providing regular receive communications; and
      at least one secondary receiver providing interference detection by scanning for interference to the main receiver and the main receiver antenna, and the at least one secondary receiver providing interference mitigation to the main receiver antenna by steering a null of the secondary receiver antenna to reduce the interference; and
   a voter controlled by the microprocessor, the voter making voting decisions between the main receiver and the at least one secondary receiver in response to the main receiver being impacted by an interference source and the at least one secondary receiver providing the interference mitigation.

24. The communication system of claim 23, wherein the voting decisions are further based on knowledge of an interference region impacting a subscriber unit of the communication system and subscriber GPS for that subscriber unit.

* * * * *